United States Patent [19]

Nagelkirk

[11] 4,320,935
[45] Mar. 23, 1982

[54] STRUCTURAL SUPPORT SYSTEM WITH LOAD CONTROL

[75] Inventor: Robert A. Nagelkirk, Holland, Mich.

[73] Assignee: Herman Miller, Inc., Zeeland, Mich.

[21] Appl. No.: 87,430

[22] Filed: Oct. 22, 1979

[51] Int. Cl.³ ............... A47B 51/00; A47B 57/00; E04G 3/00
[52] U.S. Cl. ................... 312/350; 312/306; 312/351; 248/274; 248/223.4; 108/152; 403/191
[58] Field of Search ............. 312/350, 245, 306, 351; 248/274, 288 R, 476, 223.4, 224.2; 108/152, 134; 403/191

[56] References Cited

U.S. PATENT DOCUMENTS

| 901,284 | 10/1908 | Edmunds | 248/274 |
|---|---|---|---|
| 912,936 | 2/1909 | Cowdrey | 108/152 |
| 1,211,182 | 1/1917 | Kruse | 248/274 |
| 3,087,771 | 4/1963 | Pari | 312/350 |
| 3,111,297 | 11/1963 | Conner | 108/152 |
| 3,387,812 | 6/1968 | Thoms | 248/274 |
| 3,712,697 | 1/1973 | Kelley et al. | 312/297 |
| 3,712,698 | 1/1973 | Propst et al. | 312/350 |
| 3,892,379 | 7/1975 | Hoes | 248/288 R |
| 3,933,391 | 1/1976 | Shook | 403/191 |
| 3,946,979 | 3/1976 | Ehlebracht et al. | 248/274 |

FOREIGN PATENT DOCUMENTS

| 2404411 | 9/1977 | France | 312/245 |
|---|---|---|---|
| 1362547 | 8/1974 | United Kingdom | 248/223.4 |

Primary Examiner—Victor N. Sakran
Attorney, Agent, or Firm—John E. McGarry; Richard A. Gaffin

[57] ABSTRACT

A horizontal rail assembly (10) on which a plurality of storage components (50) are hung is secured between vertical support members (34). The rail (10) carries hanger clips (24) which secure the rail in place on vertical supports. Flanges (32) on the clips are received by the vertical support members (34) to install the rail 10 at the desired height. The clips (24) are slightly loaded in tension between the rail (10) and the vertical members (34) to provide for a secure fit. The support system is provided with a cam surface (19) and screws (40), (42) for adjusting the angular orientation of the rail to level the storage components (50).

12 Claims, 4 Drawing Figures

STRUCTURAL SUPPORT SYSTEM WITH LOAD CONTROL

TECHNICAL FIELD

The invention relates to supporting structures for mobile frames on which drawers, shelves, cabinets and the like can be hung.

BACKGROUND ART

U.S. Pat. No. 3,712,698, issued Jan. 23, 1973, discloses a structural support system for drawers and the like in which a horizontal rail is suspended between vertical supports to support the desired cabinet components. The horizontal rail is detachably secured to clips which are themselves releasably mounted on the spaced vertical supports. Studs extending from the rear of the horizontal rail engage keyholes in the clips to provide a means for releasably securing the rail to the clips. The rail is loaded slightly in tension to provide for a secure attachment to the vertical posts. An L-shaped lip extending along the length of the rail serves to reinforce and rigidify the horizontal rail and provide a groove on which the cabinet components can be hung.

The frame system described above provides an extremely versatile system for hanging drawers and cabinets within an office. Releasable connections allow frequent changing of the position of the cabinets and the rail height without disturbing the vertical frame structure. Limitations of the above support system arise when the cabinets or drawers hang freely from the rail and are not supported at their lower ends against the wall. Such a freehanging cabinet may twist the rail about a horizontal axis. Twisting of the rail about the horizontal axis may result in the appearance of sagging of the cabinets.

DISCLOSURE OF INVENTION

The present invention retains the mobility and flexibility of the above-described support system while reducing the sagging of the horizontal rail due to the weight of the cabinets. The present invention uses a cliphanging arrangement for attaching the rail to the vertical supports which includes a means for leveling the rail and attached cabinets. End plugs in the rail are provided with a cam surface against which a flange of the clips is seated. A pair of screws received by the front flange of the clip are rotated to alter the contact point of the clip flange against the cam surface. In this way, the angular orientation of the rail relative to the wall can be adjusted so that the cabinet components remain level. The adjustment feature provides a means for compensating for the twisting or sagging of the rail due to the weight of the cabinets.

BRIEF DESCRIPTION OF THE DRAWINGS

The invention will be described with reference to the attached drawings in which like members bear like reference numerals wherein.

BEST MODE FOR CARRYING OUT THE INVENTION

Figure 1:
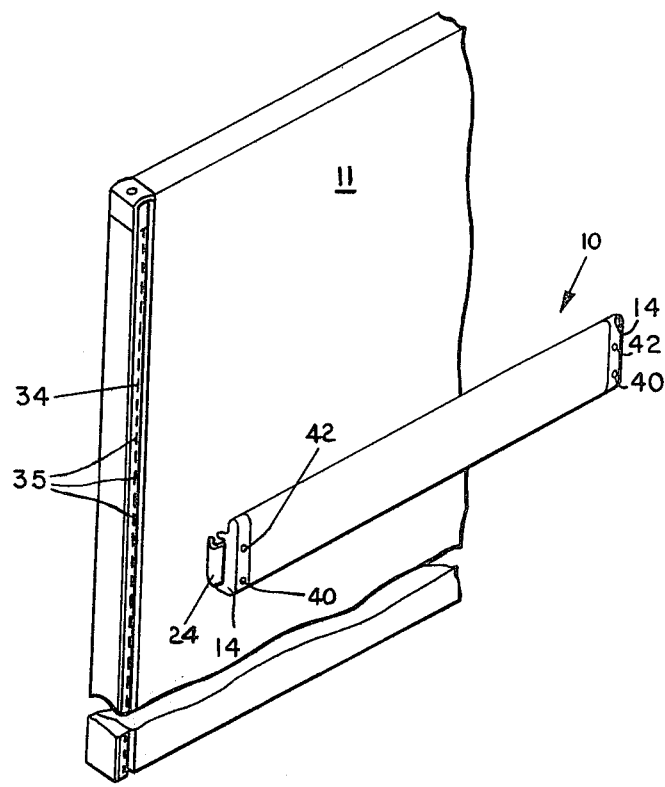
FIG. 1 is a perspective view of a horizontal rail exploded away from a vertical support mounted on a divider panel.

With reference to FIG. 1, a structural support system having a horizontal rail assembly 10 which is secured to vertical supports 34 by clips 24 is shown. The vertical supports 34 are typically imbedded in a divider panel 11 or secured to a wall. A support system employing a similar rail and clip system is disclosed in U.S. Pat. No. 3,712,698.

Figure 2:
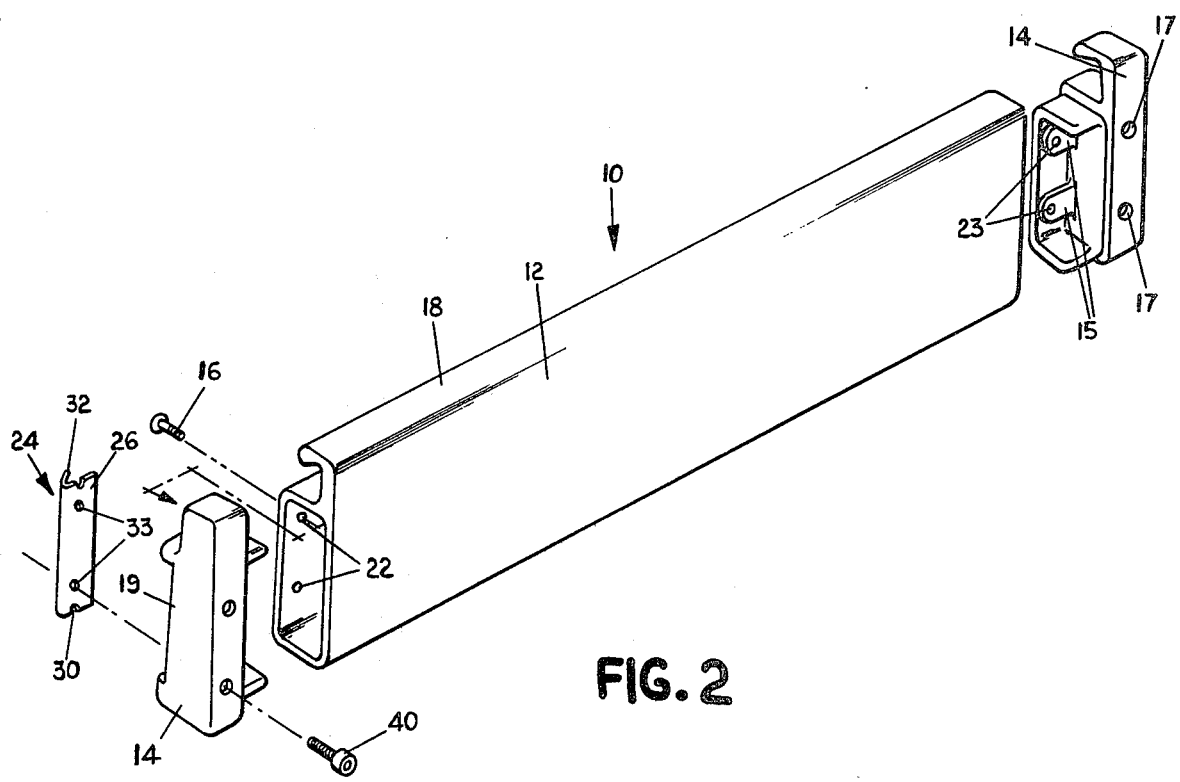
FIG. 2 is a perspective view of the rail showing the end plugs and clips exploded away from the ends of the rail.

As shown in FIG. 2, the rail assembly 10 includes a horizontally-extending extruded rail section 12. The extruded rail section 12 has a hollow portion forming the main body of the rail and an upwardly extending retaining lip 18. The retaining lip 18 defines a channel 20 for receiving a corresponding lip on a cabinet component, for example.

Figure 4:
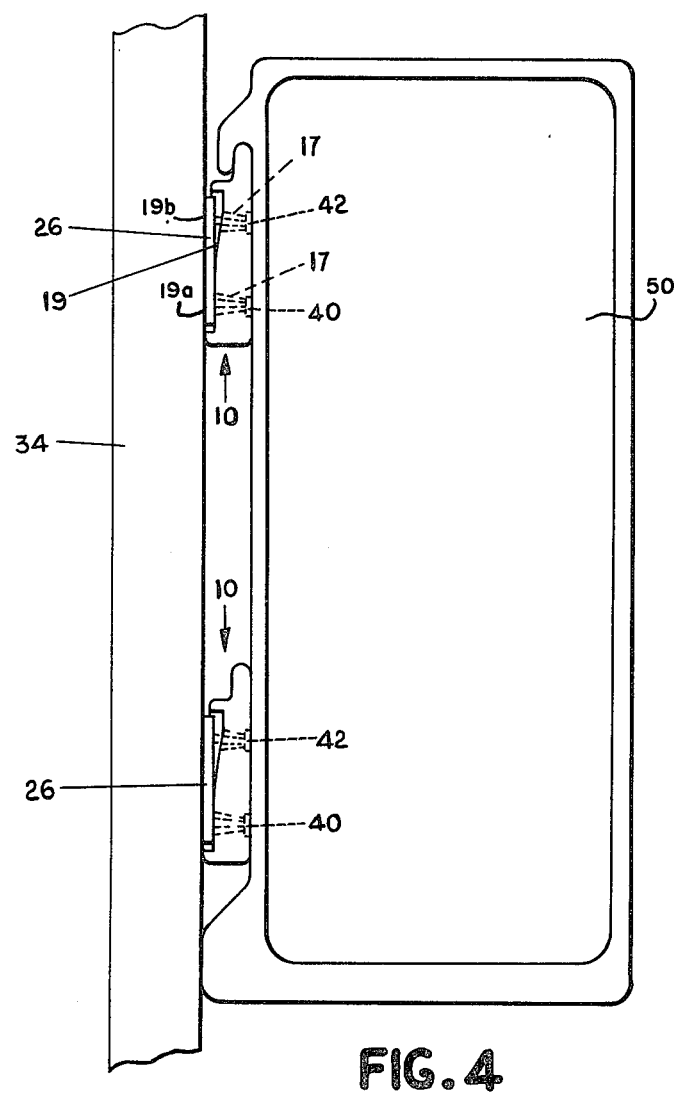
FIG. 4 is a side view of the cabinet component disclosed in U.S. Pat. No. 3,712,697 hung on the rail in which a second rail has been provided to support the lower cabinet end.

A pair of end plugs 14 positioned at the open ends of the rail section 12 close off the rail section 12. The end plugs 14 include tabs 15 which extend within the interior of the rail section 12. Threaded bores 23 disposed on the tabs 15 are aligned with apertures 22 on the rail section 12 for threadably receiving screws 16 which secure the plugs 14 to the rail section 12. A pair of flared unthreaded bores 17 are provided through the body of each end plug 14. Typically, the end plugs are secured in place prior to installation of the rail. The rear surface of each end plug 14 includes a cam surface 19 which forms part of the leveling mechanism to be discussed below. As seen in FIG. 4, the cam surface 19 has a bottom flat portion 19a, which is parallel to the front surface of the plug 14 and a top portion 19b tapered at an angle to the front surface of the plug 14.

The hanger clips 24 have a generally V-shaped cross-section. Each clip 24 has a vertically extending front flange 26 which seats against the cam surface 19 on the rear of the end plug 14. The hanger clips 24 include T-shaped rearwardly-extending flanges 32 which are received within the vertical supports 34. The T-shaped flanges permit the clip to be releasably mounted on either the right or left vertical supports. A pair of threaded apertures 33 are provided in the flange 26 for receiving screws which secure the clip 24 to the rail 10 and form the leveling mechanism for the rail.

The vertical supports 34 are elongate rails having a plurality of vertically extending slots 35 for receiving the flanges 32 on the clips 24. The vertical supports 34 are spaced apart along a wall, divider panel or open framework to provide supports on which the rail assemblies 10 are hung.

Figure 3:
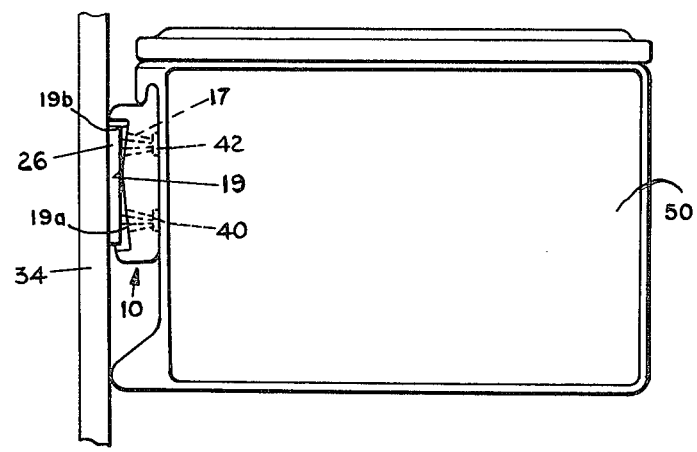
FIG. 3 is a side view of the cabinet component disclosed in U.S. Pat. No. 3,712,698 hung on the rail after the rail orientation has been adjusted according to the present invention.

When cabinet components 50 are mounted on the rail assembly 10 it is necessary to orient them in a level position. As shown in FIGS. 3 and 4, the cam surface 19 of the rear surface of each end plug 14 seats against the flange 26 on the hanger clips 24. The bores 17 on the end plugs 14 receive a pair of screws 40, 42, with the screws 40, 42 being threaded into the apertures 33 within the hanger clip 24. The adjustment screws 40, 42 are threaded into the apertures 33 on the hanger clips 24 before the rail is installed on the vertical supports, so that the screws 40, 42 secure the clip to the rail. After the storage components are installed on the rail the adjustment feature is used to place the components in a level orientation from a position external to the rail.

FIG. 3 shows the position of the cam surface 19 relative to the flange 26 on the hanger clip 24 when the horizontal rail assembly 10 is used to support lockers such as those illustrated in U.S. Pat. No. 3,712,698. When an open framework support system is used with such cabinets, the cam surface 19 seats against the flange 26 on the hanger clip to provide the necessary support with the back of the cabinet flush against the rail. The bottom of the cabinet is unsupported and tends to rotate toward the supports. The angular orientation of the rail is adjusted so that the cabinet is levelled to avoid the appearance of sagging. As shown in FIG. 3, the front surface of the rail is aligned at an angle relative to the wall or divider panel on which the vertical supports are mounted.

In FIG. 4, the mounting of the cabinets disclosed in U.S. Pat. No. 3,712,697 on the present support system is shown. Since the cabinets are relatively long, it is advantageous to provide a second rail against which the bottom portion of the cabinet rests. With these cabinets, the front surface of the rail is adjusted to remain parallel to the wall or divider panel.

In order to provide a rigid mounting of the horizontal rail 10 assembly onto the vertical supports 34, the clips 24 are spaced apart slightly less than the distance between the slots 35 one each pair of vertical supports 34. If the distance between the clips 24 and the slots 35 on the vertical supports 34 is the same, the horizontal rail assembly 10 would hang relatively loosely in the vertical supports and the clips may slip out of the vertical supports 34. Accordingly, the distance between the clips should be less than the distance between the slots 35 in the vertical supports 34 so that the hanger clips are loaded in tension between the vertical supports 34 when the rail is installed. In this way, a frictional force is created which holds the rail assembly 10 in place on the vertical supports 34. In order to seat or remove the rail from the vertical supports, it is necessary to apply a slight positive force to the rail during mounting. In placing the clips under a slight tensile force, an accidental disengagement of the rail from the vertical supports is prevented during the removal of a drawer or cabinet component from the rail.

The structural support system is installed by securing the hanger clips 24 to the rail section 12 by threading the screws 40, 42 into the apertures 33 on the clips 24. The T-shaped flanges 32 on the clips 24 are then hooked into the slots 35 on the vertical supports 34. As discussed above, it is necessary to apply a positive force to the rail assembly 10 to insure that the flanges 32 are seated within the slots 35 on the vertical support 34.

After the horizontal rail assembly 10 is installed onto the vertical supports, the adjustment screws 40, 42 are further tightened into the hanger clips 24 and the storage components 50 are hung on the horizontal rail assembly 10. During the tightening of the screws 40, 42 into the clips 24, the rail is slightly loaded in tension since the distance between the clips 24 is slightly less than the distance between the slots 35 on the vertical supports. This axial loading provides a secure engagement of the clips 24 in the slots 35. When the storage components are installed, the adjustment screws are tightened in place in the hanger clip with the lower screw 40 being tightened before the upper screw 42. In order to level the cabinet components, such as those described in U.S. Pat. No. 3,712,698, screw 42 is tightened while screw 40 is loosened until the desired cabinet orientation is obtained. Accordingly, the rail 10 is turned along its horizontal axis by adjusting the screws 40, 42 to level the attached cabinet components from a position external to the rail. The flared bores 17 through which the screws 40, 42 extend permit the rail to be turned about its horizontal axis.

The adjustment feature of the present invention provides a means of maintaining cabinet components in a level orientation by compensating for the twisting of the horizontal support rail. Since the cabinets may support up to 300 pounds, it is desirable to compensate for the twisting of the rail so that the cabinets are maintained in a level orientation. The adjustment features of the present invention do not impair the versatility of the structural support and provide the desired adaptability of previously disclosed support systems while maintaining the cabinets in a level orientation.

The foregoing specification and drawings are merely illustrative of the present invention and are not intended to limit the invention to the specific disclosed embodiment. Any variations and changes obvious to those skilled in the art are intended to be within the scope and nature of the invention which is defined by the appended claims.

The embodiments of the invention in which an exclusive property or privilege is claimed are defined as follows:

1. In a mounting system for detachably securing cabinets or the like to a wall comprising
    a pair of spaced, elongated, vertical support members, each including a plurality of clip-receiving apertures;
    at least two clips including means for releasably securing said clips to the vertical support members; and
    an elongated rail for supporting storage members in a fixed position relative to said vertical support members, said clips being adjustably mounted to said elongated rail;
    the improvement which comprises:
    means for adjusting the angular position of the rail about a horizontal axis relative to said clips from a position external to the rail.

2. The mounting system of claim 1 wherein each of said clips includes a flange which abuts a back surface of said rail.

3. The mounting system of claim 1 wherein said rail includes end portions having rearwardly-facing vertically arranged cam surfaces disposed adjacent said flange on said clips.

4. The mounting system of claim 3 wherein said means for adjusting the angular position of the rail relative to the clips includes at least one threaded member for coupling each of said end portions of the rail to the clips, and wherein said at least one threaded member is rotated to turn said rail about a said horizontal axis thereby adjusting the angular position of the rail.

5. The mounting system of claim 3 wherein said end portions of the rail are plugs inserted into the rail.

6. In a system for detachably securing storage components to a wall so that the vertical and horizontal positions of the components can be adjusted comprising
    elongated vertical support members spaced apart on a wall; and
    a horizontally extending support rail releasably secured to said vertical support members, said rail being provided with means for engaging with at least one storage component to suspend said component from the rail;

the improvement which comprises:

means for adjusting the angular position of said rail about a horizontal axis relative to the wall from a position external to the rail to maintain the components in a level orientation.

7. The system of claim 6 wherein said horizontal rail is releasably secured to the vertical support members by a pair of clips.

8. The mounting system of claim 7 wherein the distance between said pair of clips is slightly less than the distance between said vertical support members in which said clips are received so that said rail is axially loaded in tension when secured to the vertical support members.

9. The system of claim 7 wherein the means for adjusting the angular position of the rail relative to the wall comprises:

threaded members which couple said clips with end portions of said horizontal rail; and cam surfaces vertically arranged along the rear surfaces of the rail which seat against a flange on each of said clips, said flange being disposed adjacent said cam surface;

wherein the angular position of the rail is adjusted by rotating the threaded members to turn the rail about said horizontal axis thereby adjusting the angle at which said flange seats against said cam surface.

10. The mounting system of claim 9 wherein the cam surfaces are disposed on plugs inserted into the ends of the horizontal rails.

11. The mounting system of claim 6 wherein the means for engaging with the at least one storage component comprises a first flange extending upwardly along the length of the rail and a second flange extending perpendicularly from the distal portion of said first flange.

12. The mounting system of claim 3 wherein the rearwardly facing, vertically arranged cam surfaces comprises a bottom flat portion parallel to the front face of the rail and a top portion tapered from the first portion at an angle thereto.

* * * * *